United States Patent
Hara et al.

(10) Patent No.: US 9,690,740 B2
(45) Date of Patent: Jun. 27, 2017

(54) DATA PROCESSING APPARATUS, INPUT CONTROL APPARATUS, AND CONTROL METHOD

(71) Applicant: CANON KABUSHIKI KAISHA, Tokyo (JP)

(72) Inventors: Yuji Hara, Machida (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 760 days.

(21) Appl. No.: 13/742,092

(22) Filed: Jan. 15, 2013

(65) Prior Publication Data

US 2013/0198431 A1  Aug. 1, 2013

(30) Foreign Application Priority Data

Jan. 26, 2012 (JP) .................................. 2012-014576
Oct. 29, 2012 (JP) .................................. 2012-238359

(51) Int. Cl.
  *G06F 13/38* (2006.01)
  *G06F 13/40* (2006.01)
(52) U.S. Cl.
  CPC .............................. *G06F 13/4063* (2013.01)
(58) Field of Classification Search
  CPC ................................................... G06F 13/38
  See application file for complete search history.

(56) References Cited

U.S. PATENT DOCUMENTS

| 5,613,069 A * | 3/1997 | Walker ............... H04L 45/00 |
| | | 370/355 |
| 2010/0235609 A1* | 9/2010 | Inoue ................... G06T 1/20 |
| | | 712/29 |
| 2010/0241826 A1 | 9/2010 | Hara ........................... 712/29 |
| 2010/0303090 A1 | 12/2010 | Inoue ........................ 370/401 |
| 2011/0016242 A1 | 1/2011 | Hara .......................... 710/107 |
| 2012/0297392 A1 | 11/2012 | Hara et al. ................. 718/102 |

FOREIGN PATENT DOCUMENTS

| JP | 2006-245790 | 9/2006 |
| JP | 2010-217959 A | 9/2010 |

OTHER PUBLICATIONS

CN Application No. 20130022120.7—Office Action dated May 22, 2015.
Counterpart office action, Japanese Application No. 2012-238359, dated Oct. 28, 2016.

\* cited by examiner

*Primary Examiner* — John Lindlof
(74) *Attorney, Agent, or Firm* — Fitzpatrick, Cella, Harper & Scinto

(57) ABSTRACT

An input control apparatus, which accepts input of data from the outside and inputs the data to a bus in a data processing system in which a plurality of communication units are connected by the bus in a ring shape and data processed by processing units are delivered via the bus, controls acceptance of data based on the number of data items which should be output outside, are suspended from output, and remain on the bus.

17 Claims, 6 Drawing Sheets

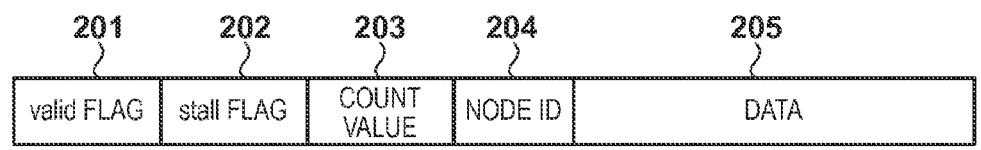
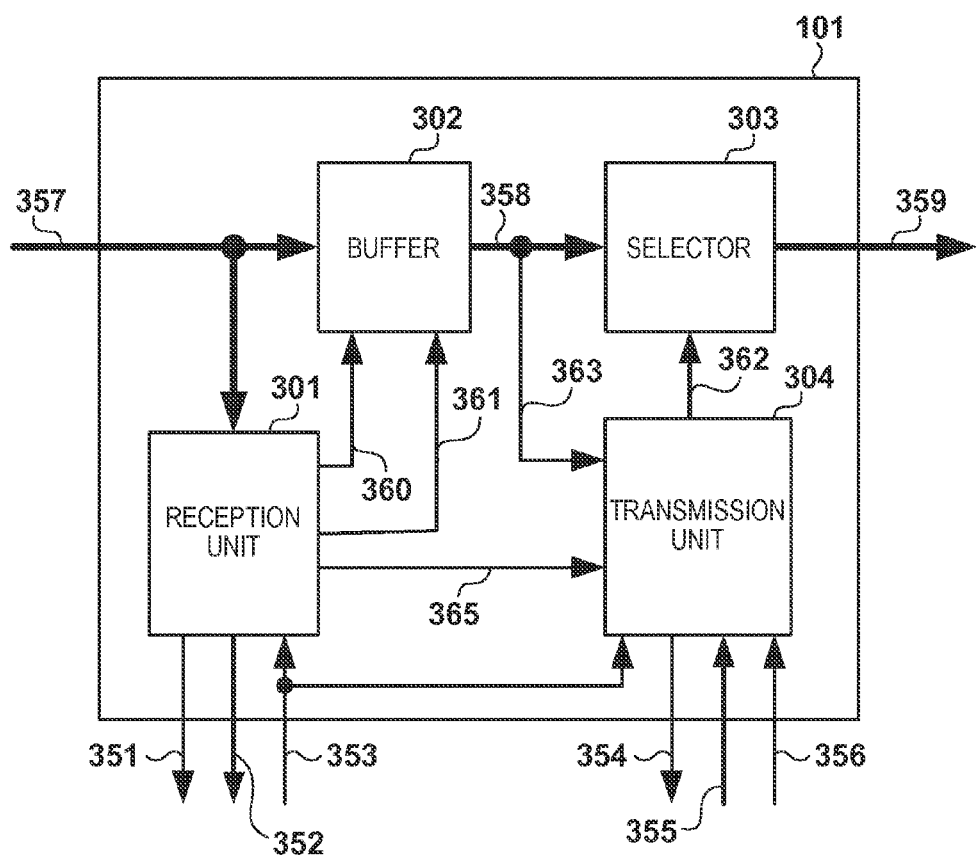

DATA PROCESSING APPARATUS, INPUT CONTROL APPARATUS, AND CONTROL METHOD

BACKGROUND OF THE INVENTION

Field of the Invention

The present invention relates to a data processing apparatus, input control apparatus, and control method for controlling input of data to a ring-shaped bus.

Description of the Related Art

A method of transferring packets in accordance with priority has conventionally been proposed as a method of performing efficient packet transfer in a data path control system in which a plurality of modules are connected to be communicable and perform parallel processing.

Japanese Patent Laid-Open No. 2010-217959 discloses a method of connecting modules by a ring bus, and transferring a data packet processed by each module to a module at the next stage to execute a series of processes. In the arrangement in Japanese Patent Laid-Open No. 2010-217959, after a given module ends processing, it sends, onto the ring bus, a signal containing an identifier for identifying the given module. A module which performs the next processing stores in advance the identifier of a module which executes immediately preceding processing, and when the signal contains the identifier, executes the processing. In Japanese Patent Laid-Open No. 2010-217959, when a module suspends processing, it transfers a signal containing information representing that the processing has been suspended. When this module receives, in response to the signal transmitted by it, a signal containing information representing that a succeeding module has suspended processing, it determines that a module which executes immediately succeeding processing cannot perform processing even if further information is transmitted, and temporarily stops transmission of information. This implements efficient packet transfer using a small storage capacity in distributed control.

When output of data is suspended in output on the ring bus, it is necessary to suppress or stop input to the ring bus. However, in the method in Japanese Patent Laid-Open No. 2010-217959, a given module only detects whether a stall has occurred in a module which executes processing immediately after processing by the given module. If output of data from the ring bus is suspended, the time corresponding to one round of the ring bus is necessary to detect by each module that data output from it has been suspended, and stop the output. A long time is required till the stop of input, and data are kept input till the stop of input. As a result, the number of stall packets increases, the transfer efficiency greatly decreases, and a deadlock may occur.

SUMMARY OF THE INVENTION

According to one aspect of the present invention, there is provided a technique of suppressing an increase in the number of packets which are suspended and stay on a ring bus.

According to one aspect of the present invention, there is provided a data processing apparatus comprising: a plurality of communication units configured to be connected by a ring-shaped bus; and a plurality of processing units corresponding to the respective communication units configured to process data supplied from the plurality of communication units, wherein when a processing unit corresponding to a first communication unit out of the plurality of communication units is in a data unacceptable state, the first communication unit adds, to data which could not be accepted by the processing unit, stall information representing that the processing unit could not accept data, and makes the data go around the ring-shaped bus, and a second communication unit out of the plurality of communication units suppresses input of data to the ring-shaped bus based on the data to which the stall information is added.

According to one aspect of the present invention, there is provided an input control apparatus which accepts input of data from outside and inputs the data to a bus in a data processing system in which a plurality of communication units are connected by the bus in a ring shape and data processed by processing units are delivered via the bus, comprising: an acquisition unit configured to acquire the number of data items which are to be output outside, are suspended from output, and remain on the bus; and a control unit configured to control acceptance of data based on the number of data items.

According to one aspect of the present invention, there is provided a control method for a data processing apparatus including a plurality of communication units configured to be connected by a ring-shaped bus, and a plurality of processing units corresponding to the respective communication units configured to process data supplied from the plurality of communication units, comprising: when a processing unit corresponding to a first communication unit out of the plurality of communication units is in a data unacceptable state, causing the first communication unit to add, to data which could not be accepted by the processing unit, stall information representing that the processing unit could not accept data, and make the data go around the ring-shaped bus; and causing a second communication unit out of the plurality of communication units to suppress input of data to the ring-shaped bus based on the data to which the stall information is added.

According to one aspect of the present invention, there is provided a control method for an input control apparatus which accepts input of data from outside and inputs the data to a bus in a data processing system in which a plurality of communication units are connected by the bus in a ring shape and data processed by processing units are delivered via the bus, comprising: causing an acquisition unit to acquire the number of data items which are to be output outside, are suspended from output, and remain on the bus; and causing a control unit to control acceptance of data based on the number of data items.

Further features of the present invention will be apparent from the following description of exemplary embodiments with reference to the attached drawings.

BRIEF DESCRIPTION OF THE DRAWINGS

FIG. 2 is a view exemplifying the data structure of a packet;

FIG. 3 is a block diagram exemplifying the arrangement of an input/output unit;

DESCRIPTION OF THE EMBODIMENTS

Figure 1:
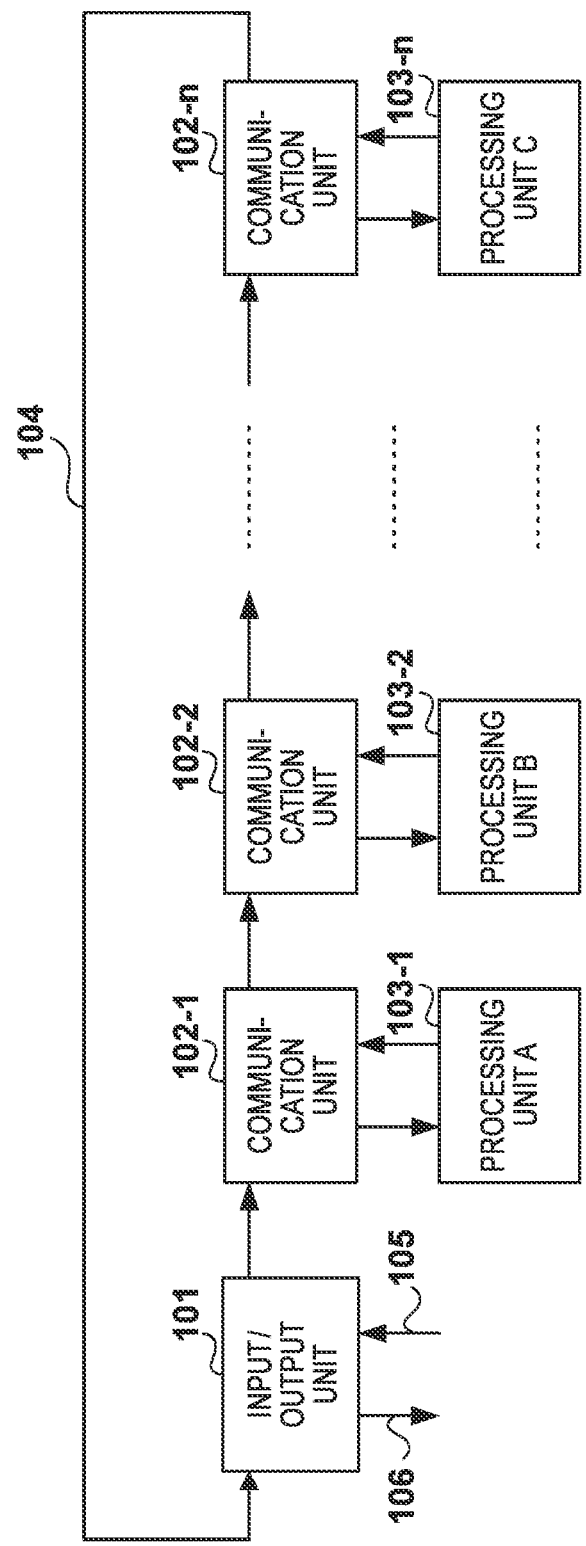
FIG. 1 is a block diagram exemplifying the arrangement of a data processing system.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

<<First Embodiment>>

The schematic arrangement of an information processing apparatus according to the first embodiment of the present invention will be described with reference to FIG. 8.

An image reading unit 820 includes a CCD sensor 824 and analog signal processing unit 826. The CCD sensor 824 converts the image of an original 800 that is formed on the CCD sensor 824 via a lens 822, into R (Red), G (Green), and B (Blue) analog signals. The analog signal processing unit 826 receives the converted image information, performs correction and the like for the respective R, G, and B colors, and then performs analog-to-digital conversion (A/D conversion). The digital full-color signals (to be referred to as multi-level digital image signals hereinafter) are input to an image processing unit 830. The image processing unit 830 performs input correction processing, spatial filter processing, color space conversion, density correction processing, and halftone processing for the digital image signals, and outputs the processed digital image signals to an image output unit 840. The image output unit 840 includes, for example, a printout unit (not shown) using an inkjet head, thermal head, or the like. The image output unit 840 prints an image on paper in accordance with the input digital image signals.

A system control unit 810 includes an arithmetic control CPU 812, a ROM 814 which stores permanent data and programs, and a RAM 816 used to temporarily save data and load a program. The system control unit 810 controls the image reading unit 820, image processing unit 830, image output unit 840, and the like, and performs centralized control of a sequence in the apparatus. An external storage device 818 is a medium (flash memory or removable storage medium) which stores parameters and programs used in the apparatus. The RAM 816 allows loading data, programs, and the like from the ROM 814 and external storage device 818.

Note that data transfer between the system control unit 810 and the image processing unit 830 is performed by, for example, DMAC (Direct Memory Access Controller) (not shown).

Figure 9:
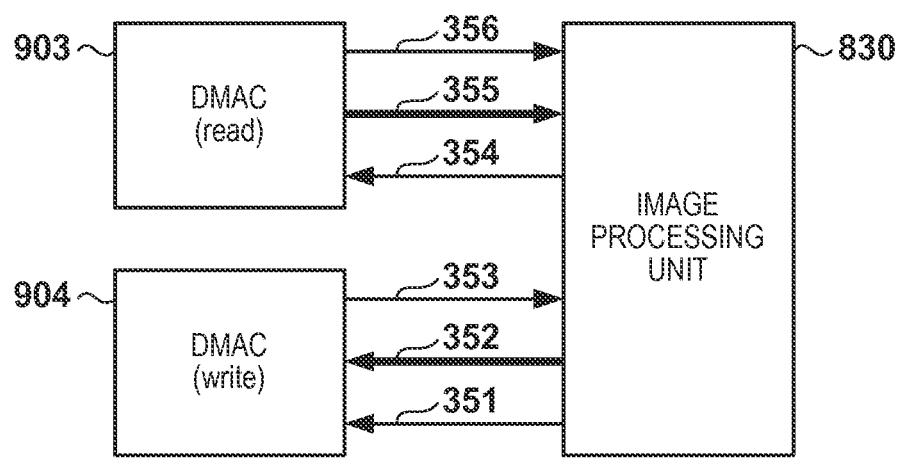
FIG. 9 is a block diagram showing a schematic arrangement regarding data transfer between an image processing unit and a system control unit.

FIG. 9 shows a schematic arrangement regarding data transfer between the image processing unit 830 and the system control unit 810.

When no stall signal is asserted from an output terminal 354 (to be described in detail later) of an input/output unit 101, a DMAC 903 transfers data held in the RAM 816 of the data system control unit 810 to the image processing unit 830 by direct memory access. When a stall signal is asserted, the DMAC 903 holds data. When no stall signal is asserted from an input terminal 353 (to be described in detail later) of the input/output unit 101, data processed by the image processing unit 830 is output to the DMAC 903. When a stall signal is asserted, the input/output unit 101 suspends output of data, and supplies data as a stall packet to a ring bus 104 (to be described in detail later). Then, a DMAC 904 transfers the data to the RAM 816 and external storage device 818 of the data system control unit 810, the image output unit 840, and the like by direct memory access.

(Data Processing System)

Figure 8:
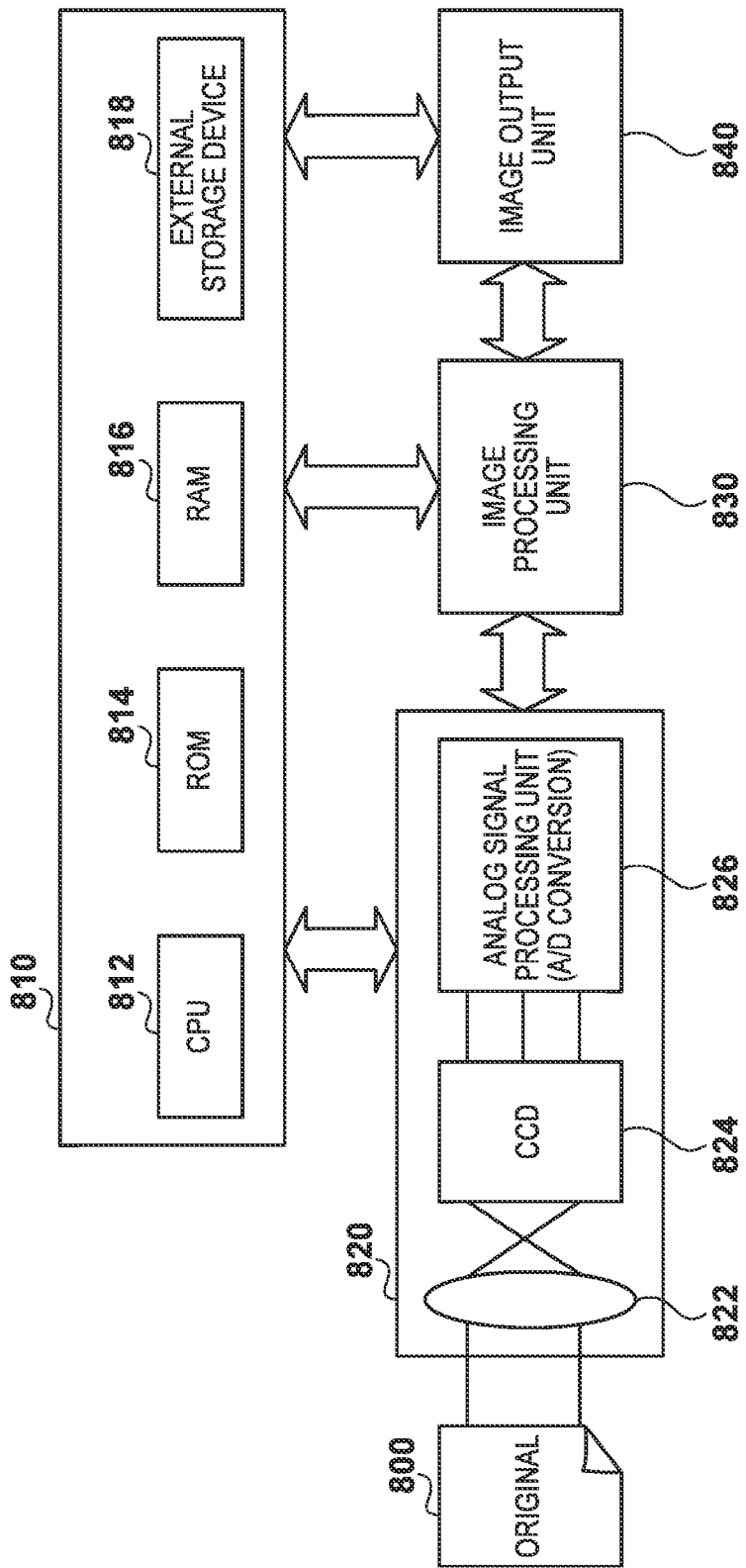
FIG. 8 is a block diagram showing the schematic arrangement of an information processing apparatus.

FIG. 1 shows the image processing unit 830 of FIG. 8 in detail. FIG. 1 is a block diagram exemplifying the schematic arrangement of a data processing system in which respective processing modules are connected by a ring-shaped bus to deliver data and sequentially process it. The data processing system includes the input/output unit 101 for inputting/outputting data, a plurality of communication units 102-1 to 102-n for delivering data to each other, and a plurality of processing units 103-1 to 103-n which correspond to the respective communication units 102-1 to 102-n and process data.

The input/output unit 101 performs, for example, input/output control of data between the data processing system and the outside. In the following description, the "outside of the data processing system" means the remaining functional units in the apparatus including the data processing system. In FIG. 8, these functional units are the system control unit 810, image reading unit 820, and image output unit 840.

The present invention is applicable to even an external apparatus which exists separately from the apparatus including the data processing system. In the input/output unit 101, DMACs may be arranged at an input terminal 105 and output terminal 106, respectively. In this case, the DMAC packetizes image data or a parameter held in the RAM 816, and inputs the packet to the image processing unit 830. Also, the DMAC depacketizes a packet output from the image processing unit 830, and transfers the data to the RAM 816 or CPU 812.

The communication units 102-1 to 102-n are connected to the adjacent communication units 102, and serve as part of the ring bus 104 to transmit data received from a specific direction (first direction) in the other direction (second direction). Note that the communication units 102-1 and 102-n are connected to the adjacent communication units 102, and also connected to the input/output unit 101. The communication units 102-1 to 102-n are connected to the processing units 103-1 to 103-n, respectively. That is, the communication units 102-1 to 102-n form the ring bus 104 together with the input/output unit 101, transmit/receive data to/from the adjacent communication units 102 and input/output unit 101, and also transmit/receive data to/from the processing units 103.

Data input via the input terminal 105 is input to the communication unit 102-1 via the input/output unit 101. Note that data is packetized, and the packet flows in one direction on the ring bus 104 (on the ring). The communication unit 102 receives a packet from the ring bus 104, and separates the packet in accordance with preset information to extract necessary data. When the processing unit 103 (to be referred to as a "corresponding processing unit" hereinafter) directly connected to the communication unit 102 can process the extracted data, the communication unit 102 outputs the data to the corresponding processing unit 103.

The processing unit 103 performs predetermined data processes (for example, color space conversion and resolution conversion) for the received data, and outputs the processed data to the corresponding communication unit 102. The communication unit 102 determines whether the data can be output to the ring bus 104, and if the data can be output, packetizes the data input from the corresponding processing unit 103, and sends the packet to the ring bus 104. A communication unit 102 corresponding to a processing unit 103 which performs the next processing for data contained in the sent packet separates the packet to extract the data. Then, the communication unit 102 causes the corresponding processing unit 103 to execute the processing in the above-described manner. By setting in advance the order of the processing units 103 which process data, the processing units 103-1 to 103-*n* sequentially process data. After the end of set data processing, the processed data is output from the output terminal 106 via the input/output unit 101.

(Data Structure)

FIG. 2 is a view exemplifying the data structure of a packet flowing through the ring bus 104. The packet contains a valid flag 201, stall flag 202, count value 203, node ID 204, and data 205. The valid flag 201 is a data area where a value indicating whether the packet is valid is stored. The stall flag 202 is a data area where a value indicating that processing is suspended for data contained in the packet is stored. The count value 203 is a value indicating the data transmission order. The node ID 204 is a data area where a value indicating an ID for identifying logical connection of data is stored. The data 205 is a data area where data input from or to be output to the communication unit is stored.

In the following description, a packet in which the valid flag 201 of the packet is "invalid" will be called a "null packet". The communication unit 102 can replace a null packet on the ring bus with a valid packet. A "valid" stall flag 202 means that a given processing unit 103 cannot process data and the corresponding communication unit 102 supplies a packet containing the unprocessed data onto the ring bus. In the following description, a packet in which the stall flag 202 is valid will be called a "stall packet".

The count value 203 is used when, for example, processes should be executed in the input order. When a value managed inside the communication unit 102 and the count value 203 match each other, the communication unit 102 can extract data from the packet, and output it to the processing unit 103. The node ID 204 contains the ID of a processing unit 103 which should process data contained in the packet, or the corresponding communication unit 102. When the node ID 204 matches the ID of the communication unit 102 or that of the corresponding processing unit 103, the communication unit 102 determines that data contained in the packet should be processed by the corresponding processing unit 103.

Upon receiving a packet from the ring bus 104, the communication unit 102 analyzes the contents and decides subsequent processing in accordance with the contents. More specifically, the communication unit 102 extracts the valid flag 201, count value 203, and node ID 204 from the packet and decides, based on the contents, how to handle the packet.

For example, when the valid flag 201 of the packet is valid, the count value 203 and node ID 204 match values managed inside the communication unit 102, and the corresponding processing unit 103 can process data, the communication unit 102 outputs data contained in the packet to the corresponding processing unit 103. In this case, at the same time as this processing, the communication unit 102 invalidates the valid flag 201 and stall flag 202 of the received packet, and outputs a null packet onto the ring bus 104.

In contrast, when the valid flag 201 is valid, the count value 203 and node ID 204 match values managed inside the communication unit 102, and the corresponding processing unit 103 cannot process data, the communication unit 102 outputs a stall packet onto the ring bus 104. That is, the communication unit 102 validates the stall flag 202 in the packet received from the ring bus 104, and sends the packet onto the ring bus 104. Also, when the valid flag 201 is valid, the node ID 204 matches a value managed inside the communication unit 102, and the count value 203 does not match a value managed inside the communication unit 102, the communication unit 102 changes the packet into a stall packet and sends it onto the ring bus 104.

When the valid flag 201 is valid, and the node ID 204 does not match a value managed inside the communication unit 102, the communication unit 102 directly sends the received packet onto the ring bus 104 without changing its contents.

Similarly, the input/output unit 101 performs the same analysis as that in the communication unit 102 for a packet received from the ring bus 104, and when data can be output from the output terminal 106, outputs the data. The above-described operations of the input/output unit 101 and communication unit 102 can implement data delivery and processes in a desired order.

(Arrangement of Input/Output Unit)

FIG. 3 is a block diagram exemplifying the schematic arrangement of the input/output unit 101. As shown in FIG. 3, the input/output unit 101 includes a reception unit 301, buffer 302, selector 303, and transmission unit 304. An output terminal 359 of the input/output unit 101 is connected to the adjacent communication unit 102-1 (downstream in the data transfer direction: second direction). An input terminal 357 is connected to the adjacent communication unit 102-*n* on the other side (upstream in the data transfer direction).

An output terminal 351, an output terminal 352, and the input terminal 353 represent in more detail the output terminal 106 shown in FIG. 1. The output terminal 351 is a terminal which outputs a valid signal indicating whether a signal to be output is valid. The output terminal 352 is a terminal which, when data can be output, outputs the data. The input terminal 353 is a terminal which inputs a stall signal indicating whether data can be output. When the stall signal is valid (stall), the reception unit 301 cannot output data from the output terminal 352.

The output terminal 354, an input terminal 355, and an input terminal 356 represent in more detail the input terminal 105 shown in FIG. 1. The output terminal 354 is a terminal which outputs a stall signal indicating whether output data from the transmission unit 304 can be output via the selector 303. When the stall signal is valid (stall), input of data to the transmission unit 304 stops. The input terminal 355 is a terminal which receives data from the outside. The input terminal 356 receives a valid signal indicating whether data input from the outside is valid.

The reception unit 301 monitors a packet input from the adjacent communication unit 102-*n* (upstream in the data transfer direction) via the input terminal 357. At the same time, the packet is input to the buffer 302, temporarily held in the buffer, and output to the selector 303 in the next clock cycle.

The reception unit 301 determines whether the valid flag 201 is valid, and the count value 203 and node ID 204 match values held in the reception unit 301, respectively. Further, when data can be output (when a stall signal input from the input terminal 353 is not in the stall state), the reception unit 301 receives the packet which satisfies these conditions. The reception unit 301 then validates the valid signal at the output terminal 351, and outputs the data outside via the output terminal 352. After receiving the data of the packet, a count value which is managed in the reception unit 301 and accessory to the data is incremented. At the same time as this operation, the reception unit 301 controls to clear (invalidate), via a signal line 360, the valid flag 201 of the packet stored in the buffer 302. Also, the reception unit 301 clears, via a signal line 361, the value of the stall flag 202 of the packet stored in the buffer 302. Further, the reception unit 301 outputs the value of a stall counter 405 (to be described later) to the transmission unit 304 via a signal line 365.

The transmission unit 304 monitors the valid flag 201 of an output packet (a signal line 358) in the buffer 302 via a signal line 363. When the valid flag 201 of the packet is valid, the transmission unit 304 causes the selector 303 to preferentially output the output packet in the buffer 302 to the output terminal 359. In this case, the transmission unit 304 cannot output a packet containing input data from the input terminal 355. To suspend data input, the transmission unit 304 validates (suspends) a stall signal to be output from the output terminal 354. When the valid flag 201 of an output packet in the buffer 302 is invalid, the stall signal to be output from the output terminal 354 is controlled by a stall counter value from the signal line 365 and a stall signal from the input terminal 353, which will be described later.

When external input data is valid (valid signal input from the input terminal 356 is valid), and a timer 601 (to be described later) in the transmission unit 304 is "0", the transmission unit 304 generates a packet in which the input data is contained and the valid flag 201 is valid. The transmission unit 304 adds, to the packet, a count value managed inside the transmission unit 304 and a node ID set in a register, and outputs the resultant packet to the selector 303 via a signal line 362. When the valid flag 201 of a packet from the transmission unit 304 is valid and the valid flag 201 of a packet from the buffer 302 is invalid, the selector 303 sends, to the ring bus 104 via the output terminal 359, the packet output from the transmission unit 304. Note that generating a packet conceptually means storing data in a null packet flowing through the ring bus. After the packet is output, the count value managed inside the transmission unit 304 is incremented.

(Arrangement and Operation of Reception Unit)

Figure 4:
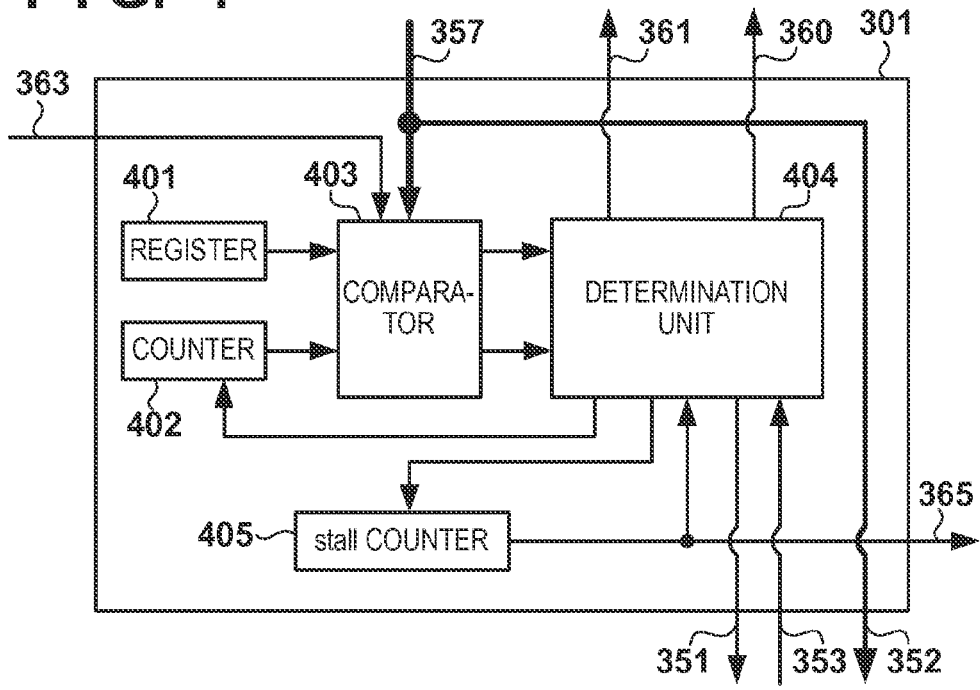
FIG. 4 is a block diagram exemplifying the arrangement of a reception unit.

The reception unit 301 will be described in detail with reference to FIG. 4. FIG. 4 is a block diagram exemplifying the schematic arrangement of the reception unit 301. As shown in FIG. 4, the reception unit 301 includes a register 401 (storage unit), a counter 402, a comparator 403, a determination unit 404, and the stall counter 405.

In the reception unit 301, the comparator 403 monitors and analyzes the valid flag 201, count value 203, and node ID 204 of a packet on the ring bus that is input from the input terminal 357. First, the comparator 403 determines whether the valid flag 201 of the input packet is valid. If the valid flag 201 of the input packet is invalid, there is no data to be output, and processing to be described later is not executed. To the contrary, if the valid flag 201 is valid, the comparator 403 compares the node ID 204 of the packet with an input node ID stored in the register 401, and determines whether these values match each other. At the same time, the comparator 403 compares the count value 203 of the packet with the value of the counter 402, and determines whether these values match each other. When the node IDs match each other as a result of the comparison, the comparator 403 sets an input node ID matching signal to a value indicating "valid", and when the count value matches the value of the counter 402, sets a count value matching signal to a value indicating "valid". Then, the comparator 403 outputs the packet to the determination unit 404. When the node IDs or count values do not match each other, the comparator 403 sets the input node ID matching signal or count value matching signal to a value indicating "invalid", and outputs the packet to the determination unit 404.

By using the determination result, the determination unit 404 executes either (1) a reception operation of transmitting the data 205 outside when data can be output outside, or (2) a stall operation of outputting a stall packet to the buffer 302 when no data can be output. These operations will be explained in detail.

(1) Reception Operation (Operation of Outputting Data to Output Terminal 352)

When the input node ID matching signal and count value matching signal are "valid" and a stall signal received via the input terminal 353 is "invalid", the determination unit 404 determines that data can be output from the output terminal 352. In this case, the determination unit 404 outputs a valid signal indicating "valid" via the output terminal 351, and outputs the data 205 of the packet via the output terminal 352.

At this time, the determination unit 404 transmits, to the buffer 302 via the signal line 360, a control signal for clearing the valid flag 201 of the packet. The buffer 302 invalidates (clears) the valid flag 201 of the temporarily held packet in accordance with the control signal. At the same time, the determination unit 404 transmits, to the buffer 302 via the signal line 361, a control signal for clearing the stall flag 202. In accordance with the control signal, the buffer 302 invalidates the stall flag 202 of the temporarily held packet. To acquire the next data, the determination unit 404 outputs a count validation signal indicating "valid" to the counter 402, and causes the counter 402 to increment the count value (by one) in the next clock cycle. When the value of the stall counter 405 is larger than "0", the value of the stall counter 405 is decremented (by one).

(2) Stall Operation (Operation of Outputting No Data to Output Terminal 352)

If the determination unit 404 receives a stall signal indicating "valid (stall)" via the input terminal 353 when the input node ID matching signal and count value matching signal are valid, it determines that no data can be output to the output terminal 352 though there is data to be output. In this case, the determination unit 404 transmits, to the buffer 302 via the signal line 361, a control signal for validating the stall flag 202 of the packet. The buffer 302 validates (suspends) the stall flag 202 of the temporarily held packet. In addition, the determination unit 404 transmits, to the stall counter 405, a control signal indicating that output of data will be suspended, and causes the stall counter 405 to increment its value (by one). Also, when the input node ID matching signal is valid and the count value matching signal is invalid, the determination unit 404 validates, via the signal line 361, the stall flag 202 of the packet temporarily held in the buffer 302, and increments the stall counter 405. The stall counter 405 counts the number of packets which should be output outside, are suspended from output, and remain on the ring bus 104.

In the stall operation, the contents of a packet temporarily held in the buffer 302 are not changed except that the stall flag 202 is validated.

(Arrangement and Operation of Transmission Unit)

Figure 5:
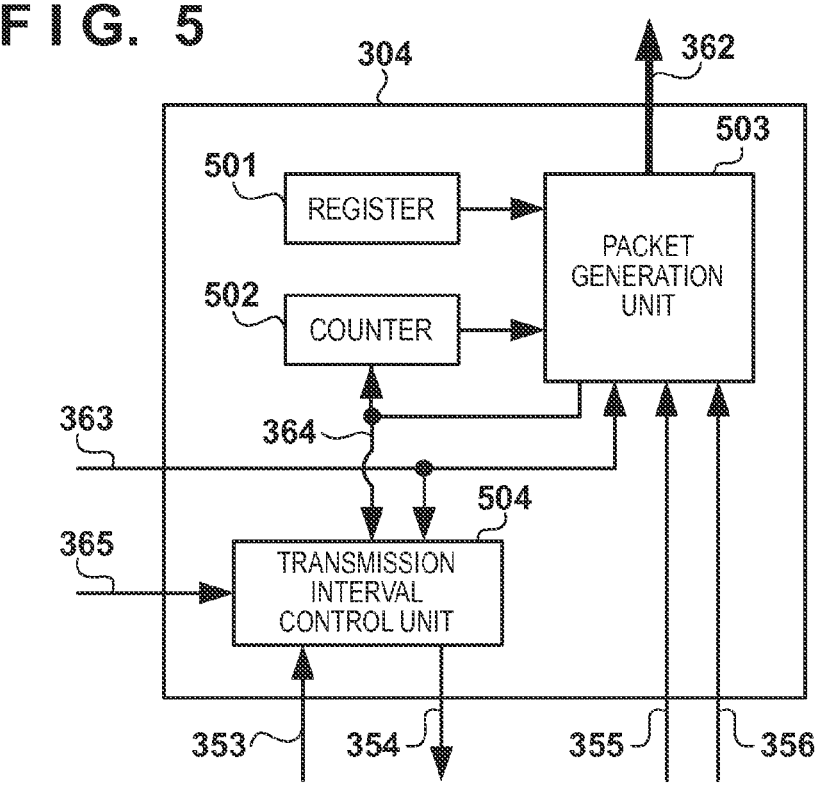
FIG. 5 is a block diagram exemplifying the arrangement of a transmission unit.

The transmission unit 304 will be described in detail with reference to FIG. 5. FIG. 5 is a block diagram exemplifying the schematic arrangement of the transmission unit 304. As shown in FIG. 5, the transmission unit 304 includes a register 501 (storage unit), counter 502, packet generation unit 503, and transmission interval control unit 504.

The valid flag 201 of an output packet in the buffer 302 is input to the packet generation unit 503 and transmission interval control unit 504 via the signal line 363. Data and a data validation signal are input to the packet generation unit 503 via the input terminals 355 and 356, respectively. The packet generation unit 503 outputs a generated packet to the selector 303 via the signal line 362. The transmission interval control unit 504 acquires, respectively from the signal line 365 and input terminal 353, the value of the stall counter of the reception unit 301 and a stall signal indicating whether data can be output. The transmission interval control unit 504 controls input of data from the outside by outputting the stall signal from the output terminal 354, and controls the output interval of packets to the ring bus 104.

The packet generation unit 503 refers to a valid signal transferred via the input terminal 356, and when the valid signal is valid, determines that data can be input from the outside via the input terminal 355. When the stall signal output via the output terminal 354 is invalid, that is, it does not indicate the input stall state, the data from the outside is input to the packet generation unit 503. Upon receiving the data, the packet generation unit 503 generates a packet in which the data is contained as the data 205, and the count value of the counter 502 and an output node ID set in the register 501 are set as the count value 203 and node ID 204. At this time, the packet generation unit 503 sets the valid flag of the packet to be generated to be valid, and the stall flag to be invalid. Then, the packet generation unit 503 outputs the packet to the selector 303. The packet generation unit 503 transmits a control signal to the counter 502 so that the counter 502 increments the count value (by one) in the next clock cycle.

Next, an example of the arrangement of the transmission interval control unit 504 will be explained with reference to FIG. 6. The transmission interval control unit 504 includes the timer 601, a comparator 602, a transmission interval signal generation unit 603, a first register 604, and a timer register 605.

The timer 601 is a functional unit which controls the transmission interval. The timer 601 is formed from, for example, a down counter having a load function of counting down from a loaded value toward 0. When a packet generated by the packet generation unit 503 is output from the selector 303 to the ring bus, a transmission interval stored in the timer register 605 is loaded in the next cycle. The timer register 605 is a register for setting a transmission interval in the timer 601. The transmission interval to be set here is an interval at which the input/output unit 101 packetizes data from the outside and transmits the packet onto the ring bus. The communication units 102-1 to 102-n may have this function. For example, for n=12, the transmission interval is set to 4. Output suppressing control is applied based on a packet which has been output from the communication unit 102 and is suspended from processing. Accordingly, the number of packets output from the communication unit 102 onto the ring bus can be suppressed to 3.

Figure 6:
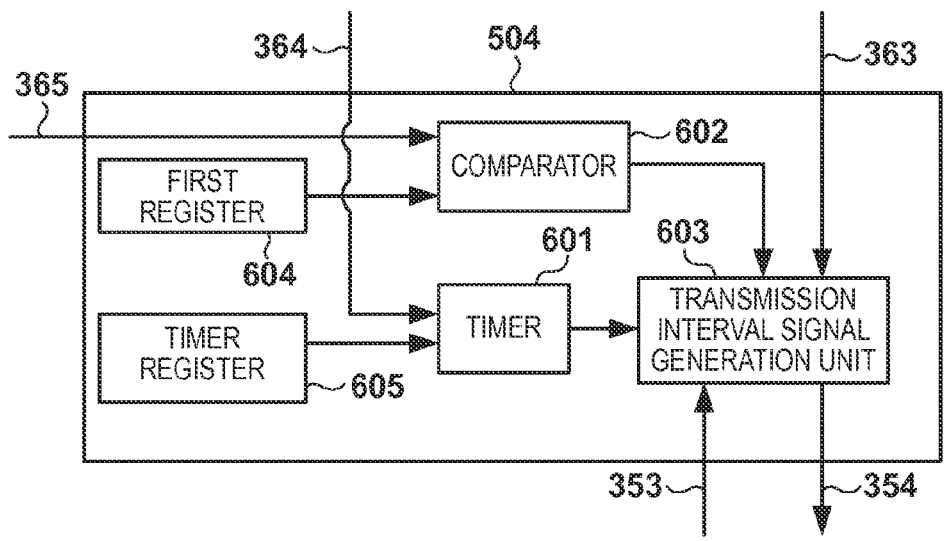
FIG. 6 is a block diagram exemplifying the arrangement of a transmission interval control unit.

For example, as shown in FIG. 6, information representing that a packet generated by the packet generation unit 503 has been output from the selector 303 to the ring bus may be acquired from a control signal transmitted to the counter 502. Alternatively, the timer 601 may be notified of this using another mechanism. After counting down to "0", the timer 601 holds the value "0" until a value is loaded next.

The comparator 602 compares a stall counter value acquired via the signal line 365 with a predetermined value (threshold) stored in the first register 604. If the stall counter value is equal to or larger than the predetermined value, the comparator 602 outputs "1"; otherwise, outputs "0". The first register 604 is a register which stores a predetermined value for evaluating the value of the stall counter 405. The predetermined value is smaller than the number of packets which can be stored in one round of the ring bus. This is because, when a deadlock occurs, the value of the stall counter 405 becomes a value equal to or larger than the number of packets which can be stored in one round of the ring bus. If the value of the first register is set as this value, no deadlock can be prevented.

The transmission interval signal generation unit 603 generates a stall signal which is output to the output terminal 354 and indicates whether data can be input. As is apparent from the above description, when the stall signal is valid (stall), it represents that data cannot be input from the outside. When the stall signal is invalid, it represents that data can be input from the outside.

The operation of the transmission interval control unit 504 in FIG. 6 will be explained. First, the values of the first register 604 and timer register 605 are set as initial settings by a CPU (not shown) or the like. Then, the comparator 602 compares a stall count value acquired from the signal line 365 with a value set in the first register 604. At the same time, if the value of the timer 601 is not "0", the timer 601 is counted down. The transmission interval signal generation unit 603 executes the following three different operations in accordance with the valid flag 201 input via the signal line 363 and the value of an output from the comparator 602.

(1) Case in which Valid Flag 201 Input from Signal Line 363 is Valid

Since the packet generation unit 503 cannot output a packet, a stall signal indicating "valid" is output via the output terminal 354, and input of data from the outside is suspended. When the valid flag 201 is invalid, the following operation (2) or (3) is executed.

(2) Case in Which Output from Comparator 602 is "0"

Since the value of the stall counter 405 is smaller than the predetermined value of the first register 604, the stall signal is set to be valid or invalid based on the value of the timer 601, and output via the output terminal 354. That is, when the value of the timer 601 is "0", the stall signal is invalidated to accept data input from the outside. In other cases, the stall signal is validated to suspend input from the outside.

(3) Case in which Output from Comparator 602 is "1"

In this case, the value of the stall counter 405 is equal to or larger than the predetermined value of the first register 604. This means that the frequency of occurrence of packets which have been suspended from output in the reception unit 301 of the input/output unit 101 is high. At this time, if the stall signal received via the input terminal 353 is valid, no data can be output outside from the output terminal 352. In order not to further increase the number of stall packets, the transmission interval signal generation unit 603 outputs a stall signal indicating "valid" via the output terminal 354 to suspend input of data from the outside. In contrast, if the stall signal received via the input terminal 353 is invalid, data can be output outside via the output terminal 352. Hence, the stall signal to be output from the output terminal 354 is controlled based on the value of the timer 601, similar to (1).

As described above, in the first embodiment, the output interval of a packet from the transmission unit 304 to the ring bus 104, that is, input of data from the outside to the ring bus 104 is controlled by controlling a stall signal to be output from the output terminal 354. In the above description, the transmission interval control unit 504 controls validation and invalidation of a stall signal to be output from the output terminal 354 based on a stall signal from the input terminal 353, but may control it based on only the value of the stall counter 405. That is, input may be suspended based on only whether the number of packets suspended from output becomes equal to or larger than a predetermined value. In this case, a stall signal to be output from the output terminal 354 can be controlled more simply.

Although one input/output unit 101 performs input and output in the above description, the present invention is not limited to this. It is also possible to prepare an input unit and output unit separately, control input of data onto the ring bus 104 by the input unit, and control output of data from the ring bus 104 by the output unit. In this case, the output unit notifies the input unit of the value of the stall counter 405 and a stall signal from the input terminal 353 by using a separately prepared information notification mechanism or the like. The input unit performs input control based on the notified/acquired information. The information may be contained in a packet and notified. When a packet contains the information, for example, the input unit is arranged on the ring bus 104 to be adjacent downstream to the output unit. If the output unit is arranged to be adjacent downstream to the input unit, information from the output unit reaches the input unit through one round of the ring bus. This makes it difficult to properly perform input control and suspend data input.

As described above, in the input/output unit 101, the transmission unit 304 acquires the value of the stall counter 405 and a stall signal from the input terminal 353. The input side of the data processing system can therefore grasp a state in which data output stays on the output side. When data output stays and many valid packets which have not been output exist on the ring bus, a deadlock can be effectively prevented by reducing the amount of data to be input to the ring bus. In other words, input of data from the input side can be stopped early before the ring bus 104 is congested with stall packets. Immediately after canceling the state in which many stall packets exist on the ring bus 104, the stop of data input can be canceled, and optimum data input suited to the degree of congestion of the ring bus can be implemented. By considering the degree of congestion of packets on the ring bus, the frequency of data input can be maintained appropriately without extremely decreasing it.

<<Second Embodiment>>

A transmission interval control unit 504 according to the second embodiment of the present invention will be described with reference to FIG. 7. Note that the data structure of a packet, and the arrangements and operations of a data processing system, an input/output unit 101, a communication unit 102, and a reception unit 301 and transmission unit 304 in the input/output unit 101 are the same as those in the first embodiment, and a description thereof will not be repeated.

Figure 7:
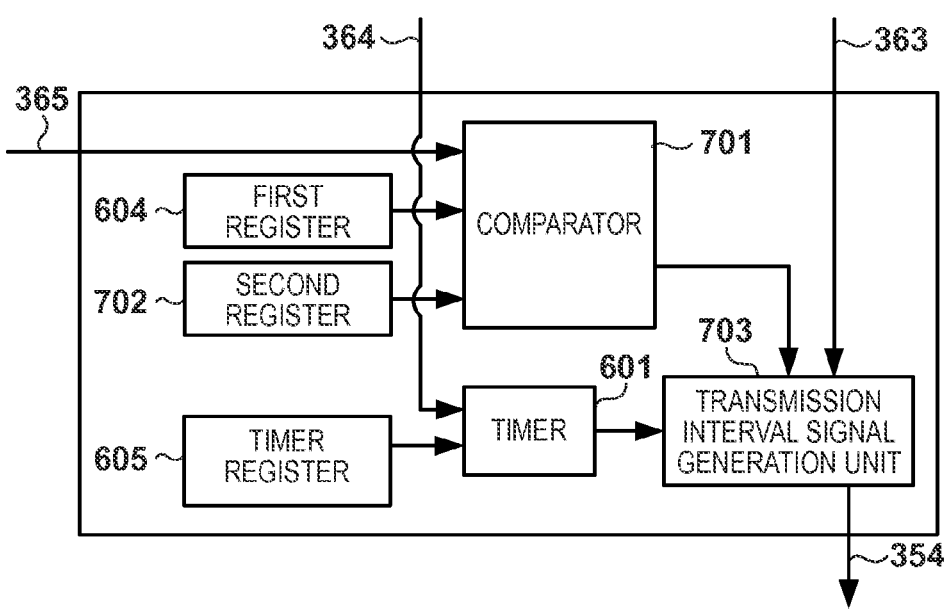
FIG. 7 is a block diagram exemplifying the arrangement of a transmission interval control unit in the second embodiment.

In FIG. 7, the same reference numerals as those in FIG. 6 in the first embodiment denote functional units having the same functions, and a description thereof will not be repeated. The second embodiment is different from the first embodiment in that a comparator 701 replaces the comparator 602, and a second register 702 is added. Further, a transmission interval signal generation unit 703 replaces the transmission interval signal generation unit 603. The input terminal 353 is omitted because it is not used in the second embodiment.

The comparator 701 compares a stall counter value from a signal line 365 with the first predetermined value stored in a first register 604 and the second predetermined value stored in the second register 702. More specifically, the comparator 701 keeps outputting a value "1" until, after the stall counter value increases and becomes equal to or larger than the first predetermined value in the first register 604, it decreases and becomes equal to or smaller than the second predetermined value in the second register 702.

In this case, when the second predetermined value is larger than the first predetermined value, the stall counter value may decrease without exceeding the second predetermined value after exceeding the first predetermined value. In this case, when the stall counter value becomes smaller than the first predetermined value, the comparator 701 may output "0" regardless of the second predetermined value. Hence, even when the stall counter value greatly increases as the number of stall packets on a ring bus 104 increases, input of data can restart immediately after data is output outside and the number of stall packets tends to decrease. By setting the first predetermined value to be small to some extent, acceptance of data input from the outside is suspended immediately when a sign of increasing the number of stall packets appears. This can greatly reduce the possibility of occurrence of a deadlock on the ring bus 104.

The first predetermined value of the first register 604 may be larger than the second predetermined value of the second register 702. In this case, the comparator 701 keeps outputting "1" until the stall counter value becomes equal to or smaller than the second predetermined value after becoming equal to or larger than the first predetermined value. In this case, input of data does not restart immediately after the value of a stall counter 405 becomes lower than the value of the first register upon output of stall packets after it exceeds the value of the first register to suspend input. After stall packets are output by a predetermined number or more and the value of the stall counter 405 becomes smaller than the value of the second register, input starts.

In any case, the first register 604 is a register which stores the first predetermined value for deciding a start point at which the comparison result of the comparator 701 becomes "1". The second register 702 is a register which stores the second predetermined value for deciding a start point at which the comparison result of the comparator 701 becomes "0". However, when the first predetermined value is smaller than the second predetermined value, the first predetermined value also serves as a threshold for deciding a start point at which the comparison result of the comparator 701 becomes "0", similar to the first embodiment. The predetermined values of the first register 604 and second register 702 need to be smaller than the number of packets which can be stored in one round of the ring bus. This is because, when a deadlock occurs, the value of the stall counter 405 becomes a value equal to or larger than the number of packets which can be stored in one round of the ring bus. If the predetermined values set to this value, no deadlock can be prevented.

Based on an output from the comparator 701, an output from a timer 601, and an output from a signal line 363, the transmission interval signal generation unit 703 generates a stall signal to be output to an output terminal 354.

The operation of the transmission interval control unit 504 in FIG. 7 will be explained. First, the values of the first register 604, a timer register 605, and the second register 702 are set as initial settings by a CPU (not shown) or the like. Then, the comparator 701 compares a stall count value from the signal line 365 with the first and second predetermined values. At the same time, if the value of the timer 601 is not "0", the timer 601 is counted down. The transmission interval signal generation unit 703 executes one of the following three different operations in accordance with a valid flag from the signal line 363 and the value of an output from the comparator 701.

(1) Case in which Valid Flag from Signal Line 363 is Valid

In this case, a packet generated by a packet generation unit 503 cannot be output. Thus, the transmission interval signal generation unit 703 validates the stall signal from the output terminal 354, and then suspends input of data from the outside. In other cases, the following operation (2) or (3) is performed.

(2) Case in which Output from Comparator 701 is "0"

In this case, the value of the stall counter 405 is smaller than a smaller one of the first and second predetermined values. Alternatively, the value of the stall counter 405 becomes equal to or larger than a larger one of the first and second predetermined values, then decreases, and becomes equal to or smaller than the second predetermined value. Also, when the first predetermined value is smaller than the second one, the value of the stall counter 405 becomes equal to or larger than the first predetermined value, then decreases, and becomes smaller than the first predetermined value without becoming equal to or larger than the second predetermined value.

In these cases, the transmission interval signal generation unit 703 controls a stall signal from the output terminal 354 in accordance with the value of the timer 601. More specifically, the transmission interval signal generation unit 703 outputs, from the output terminal 354, a stall signal indicating "invalid" when the value of the timer 601 is 0, and a stall signal indicating "valid" in other cases.

(3) Case in which Output from Comparator 701 is "1"

In this case, after the value of the stall counter 405 becomes equal to or larger than the value of the first register, it increases or decreases, but does not become equal to or smaller than the value of the second register 702. Also, when the first predetermined value is smaller than the second one, the value of the stall counter 405 becomes equal to or larger than the first predetermined value, and then becomes neither equal to or larger than the second predetermined value nor smaller than the first predetermined value. In these cases, the frequency of occurrence of stall packets in the input/output unit 101 is high. In these cases, the transmission interval signal generation unit 703 outputs, from the output terminal 354, a stall signal indicating "valid", and suspends input of data from the outside.

As described above, in the second embodiment, a stall signal from the output terminal 354 is controlled using the output result of the comparator 701 that is based two predetermined values. For example, the first predetermined value is set to be smaller than the second predetermined value. In this case, even when the number of stall packets on the ring bus 104 greatly increases, input of data can restart immediately after data is output outside and the number of stall packets tends to decrease. By setting the first predetermined value to be small to some extent, acceptance of data input from the outside is suspended immediately when a sign of increasing the number of stall packets appears. This can greatly reduce the possibility of occurrence of a deadlock on the ring bus 104. Setting the first predetermined value to be larger than the second one can prevent frequent switching between stall of input and cancellation of it.

Although a single data path has been described above, the present invention is also applicable to a multi-data path. When the present invention is applied to a multi-data path, a data path ID may be set in the format of a packet to identify a data path for processing the packet. When the multi-data path is handled, the threshold of a stall counter may be set for each data path. For example, for a data path on which a packet is preferentially processed, a counter value serving as the trigger of input stop may be set to be larger than a counter value serving as the trigger of input stop for another data path.

In the above description, the DMAC executes packetization and depacketization. However, the CPU may prepare a data packet and command packet and directly input them to the DRAM.

The schematic arrangement views of the respective units of the data processing apparatus used in the description of the embodiments aim to explain connections between circuits and functional units, and do not intend to limit the positional relationship and the number of components in each arrangement. For example, it suffices to arrange three or more communication units (including inputs and outputs) in order to practice the present invention. Also, it suffices to arrange two or more processing units.

In the above embodiments, image data is a processing target for descriptive convenience. However, the present invention is also applicable to a processing apparatus which processes data other than an image, such as moving image data, audio data, or numerical data.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-014576 filed on Jan. 26, 2012, and 2012-238359 filed on Oct. 29, 2012, which are hereby incorporated by reference herein in their entirety.

What is claimed is:

1. An input and output control apparatus which accepts input of data from outside of a data processing system, inputs the data to a bus in the data processing system and outputs data, for which processing by the data processing system is completed, from the bus to outside, wherein the data processing system includes a plurality of communication units and a plurality of processing units and the plurality of communication units are connected by the bus in a ring shape and data processed by the plurality of processing units are delivered via the bus in the data processing system, the input and output control apparatus comprising:

a reception unit configured to receive, from the bus, data for which all processing by the data processing system has been completed and thereby the data being in a state to be output to the outside;

a determination unit configured to determine whether output of the data, for which all processing by the data processing system has been completed, from the bus to the outside is possible or not;

a transmission unit configured to transmit, to the bus, the data for which all processing by the data processing system has been completed but of which the output from the bus to the outside has been suspended in a case where the determination unit determines that the output of the data, for which all processing by the data processing system has been completed, from the bus to the outside is not possible;

a counting unit configured to count a number of data items for which all processing by the data processing system has been completed, of which the output to the outside is suspended according to the determination by the determination unit, and which remain on the bus; and a control unit configured to control input of data from the outside to the bus based on the number of the data items.

2. The apparatus according to claim 1, wherein when the number of the data items is larger than or equal to a first predetermined value, the control unit suspends input of data from the outside.

3. The apparatus according to claim 1, wherein the control unit suspends input of data from the outside from the point when the number of the data items becomes larger than or equal to a first predetermined value until the number of the data items becomes less than or equal to a second predetermined value larger than the first predetermined value by decreasing after exceeding the second predetermined value.

4. The apparatus according to claim 1, wherein the control unit suspends input of data from the outside from the point when the number of the data items becomes larger than or equal to a first predetermined value until the number of the data items becomes less than or equal to a second predetermined value smaller than the first predetermined value.

5. The apparatus according to claim 1, wherein the control unit further controls input of data from the outside based on information representing whether output of data to the outside is suspended.

6. A control method for an input and output control apparatus which accepts input of data from outside of a data processing system inputs the data to a bus in the data processing system and outputs data, for which processing by the data processing system is completed, from the bus to outside, wherein the data processing system includes a plurality of communication units and a plurality of processing units and the plurality of communication units are connected by the bus in a ring shape and data processed by the plurality of processing units are delivered via the bus in the data processing system, the method comprising:

receiving, from the bus, data for which all processing by the data processing system has been completed and thereby the data being in a state to be output to the outside;

determining whether output of the data, for which all processing by the data processing system has been completed, from the bus to the outside is possible or not;

transmitting, to the bus, the data for which all processing by the data processing system has been completed but of which the output from the bus to the outside has been suspended in a case where it is determined that the output of the data, for which all processing by the data processing system has been completed, to the outside from the bus is not possible;

counting a number of data items for which all processing by the data processing system has been completed, of which the output to the outside is suspended according to the determination at the determining, and which remain on the bus; and controlling input of data from the outside to the bus based on the number of the data items.

7. The apparatus according to claim 1, wherein the reception unit receives the data for which all processing by the data processing system has been completed, and wherein the reception unit outputs, to the outside, the data for which all processing by the data processing system has been completed, in a case where the determination unit determines that the output of the data, for which all processing by the data processing system has been completed, from the bus to the outside is possible.

8. The apparatus according to claim 1, wherein the counting unit increments a count value when the output of the data, for which all processing by the data processing system has been completed, to the outside from the bus is suspended according to the determination by the determination unit, and decrements the count value in a case where the count value is equal to or greater than 1 and the reception unit outputs, to the outside, the data for which all processing by the data processing system has been completed.

9. The apparatus according to claim 1, wherein the reception unit outputs the data, for which all processing by the data processing system has been completed, from the bus to the outside based on a signal indicating whether output of data from the bus to the outside is possible.

10. The apparatus according to claim 1, wherein the determination unit further performs the determination based on the signal indicating whether output of data from the bus to the outside is possible.

11. The apparatus according to claim 1, wherein the reception unit transmits, from the bus to the outside, data for which all processing by the data processing system has been completed.

12. The apparatus according to claim 11, wherein the transmission unit causes the data, for which all processing by the data processing system has been completed, to go around the bus in the data processing system in a case where the determination unit determines that it is not possible to output the data for which all processing by the data processing system has been completed.

13. The apparatus according to claim 1, wherein the control unit permits input of data from the outside in a case where the data for which all processing by the data processing system has been completed but of which the output from the bus to the outside has been suspended is output to the outside and the number of the data items is changed from a first value at which input of data from the outside is suspended to a second value at which input of data from the outside is permitted.

14. The apparatus according to claim 1, wherein the determination unit determines whether output of the data, which is received by the reception unit and for which all processing by the data processing system has been completed, from the bus to the outside is possible or not.

15. The apparatus according to claim 1, wherein the input and output control apparatus is included in the data processing system and is neither the plurality of communication units nor the plurality of processing units.

16. An input and output control apparatus which accepts input of data from outside of a data processing system, inputs the data to a bus in the data processing system and outputs data, for which processing by the data processing system is completed, from the bus to outside, wherein the data processing system includes a plurality of communication units and a plurality of processing units and the plurality of communication units are connected by the bus in a ring shape and data processed by the plurality of processing units are delivered via the bus in the data processing system, the input and output control apparatus comprising:
- a reception unit configured to receive, from the bus, data that is in a state to be output to the outside;
- a determination unit configured to determine whether output of the data that is received by the reception unit and is in a state to be output from the bus to the outside is possible or not;
- an output unit configured to output the data that is received by the reception unit and is in a state to be output from the bus to the outside in a case where the determination unit determines that the output of the data that is in a state to be output from the bus to the outside is possible;
- a transmission unit configured to transmit, to the bus, the data that is in a state to be output from the bus to the outside in a case where the determination unit determines that the output of the data that is in a state to be output from the bus to the outside is not possible;
- a counting unit configured to count a number of data items which are in a state to be output from the bus to the outside, of which the output to the outside is suspended according to the determination by the determination unit, and which remain on the bus; and
- a control unit configured to control input of data from the outside to the bus based on the number of the data items.

17. A control method for an input and output control apparatus which accepts input of data from outside of a data processing system, inputs the data to a bus in the data processing system and outputs data, for which processing by the data processing system is completed, from the bus to outside, wherein the data processing system includes a plurality of communication units and a plurality of processing units and the plurality of communication units are connected by the bus in a ring shape and data processed by the plurality of processing units are delivered via the bus in the data processing system, the method comprising:
- receiving, from the bus, data that is in a state to be output to the outside;
- determining whether output of the data that is received by the reception unit and is in a state to be output from the bus to the outside is possible or not;
- outputting the data that is received by the reception unit and is in a state to be output from the bus to the outside in a case where it is determined that the output of the data that is in a state to be output from the bus to the outside is possible;
- transmitting, to the bus, the data that is in a state to be output from the bus to the outside in a case where it is determined that the output of the data that is in a state to be output from the bus to the outside is not possible;
- counting a number of data items which are in a state to be output from the bus to the outside, of which the output to the outside is suspended according to the determination at the determining, and which remain on the bus; and
- controlling input of data from the outside to the bus based on the number of the data items.

\* \* \* \* \*